United States Patent [19]

Masuda et al.

[11] 4,111,275

[45] Sep. 5, 1978

[54] COMPACT CAB-OVER EQUIPPED WITH A COOLER CONDENSER

[75] Inventors: Joji Masuda, Yokohama; Makoto Moriya, Tokyo, both of Japan

[73] Assignee: Nissan Motor Company, Limited, Japan

[21] Appl. No.: 750,621

[22] Filed: Dec. 15, 1976

[30] Foreign Application Priority Data

Dec. 15, 1975 [JP] Japan .......................... 50/169187[U]

[51] Int. Cl.² ............................................. B60K 11/04
[52] U.S. Cl. .................................... 180/68 R; 62/244; 123/41.49; 165/51; 180/54 A
[58] Field of Search ............................ 180/68 R, 54 A; 296/28 C; 62/239, 244; 123/41.48, 41.49, 41.51; 165/51, 41

[56] References Cited

U.S. PATENT DOCUMENTS

| 2,781,102 | 2/1957 | Prichard | 296/28 C |
|---|---|---|---|
| 2,895,310 | 7/1959 | Benisch | 62/239 |
| 2,994,394 | 8/1961 | Underwood | 180/68 R |
| 3,011,581 | 12/1961 | Wood | 296/28 C |
| 3,306,067 | 2/1967 | Anglin | 62/244 |
| 3,381,492 | 5/1968 | Dixon | 62/239 |
| 3,606,762 | 9/1971 | Anglin et al. | 62/239 |
| 3,929,202 | 12/1975 | Hobbensiefken | 296/28 C |
| 3,933,136 | 1/1976 | Burst | 180/54 A |

*Primary Examiner*—David M. Mitchell

[57] ABSTRACT

A cab-over is equipped with a cooler condenser disposed under the cab floor and spaced forwards from a radiator for an engine mounted under the cab. The condenser has a core face thereof slanted forwards or backwards by a predetermined angle from the vertical of the vehicle. With this arrangement, the effect of relatively hot air passed through the condenser to the radiator has been minimized and sufficient relatively cool air passing through the radiator for preventing of overheat of the engine has been secured.

2 Claims, 3 Drawing Figures

COMPACT CAB-OVER EQUIPPED WITH A COOLER CONDENSER

The present invention relates to a compact cab-over, that is; a compact automotive vehicle having a cab at the front and over the engine. More particularly, the present invention relates to an arrangement of a cooler condenser for a refrigeration device in the vehicle.

When it is necessary to install an air cooling device in a compact cab-over truck, there is the difficulty in finding room for a condenser for the refrigeration device because the vehicle is very small in size.

According to one conventional practice, a condenser is disposed in front of a radiator for the engine and adjacent to the same by laying a core face of the condenser on a core face of the radiator. With this arrangement, because the condenser causes an abrupt reduction in the amount of cooling air passing through the radiator and relatively hot air passing through the condenser enters the radiator, there is the great possibility that the engine is overheated and stalls especially when the vehicle is at a stand-still.

According to another conventional practice, a condenser is disposed in front of and spaced forwards from a radiator for the engine. With this arrangement, the amount of cool air passing through the radiator is reduced abruptly due to the condenser. Thus there is the possibility that the engine is overheated and stalls especially when the vehicle is at a stand-still.

It is therefore an object of the present invention to provide an arrangement of a condenser by which overheating of an engine is prevented.

It is another object of the present invention to provide a simple arrangement of a condenser by which without any change of a radiator for an engine, overheating of the engine is prevented.

The present invention will be specifically described hereinafter with reference to the accompanying drawings, in which.

Figure 1:
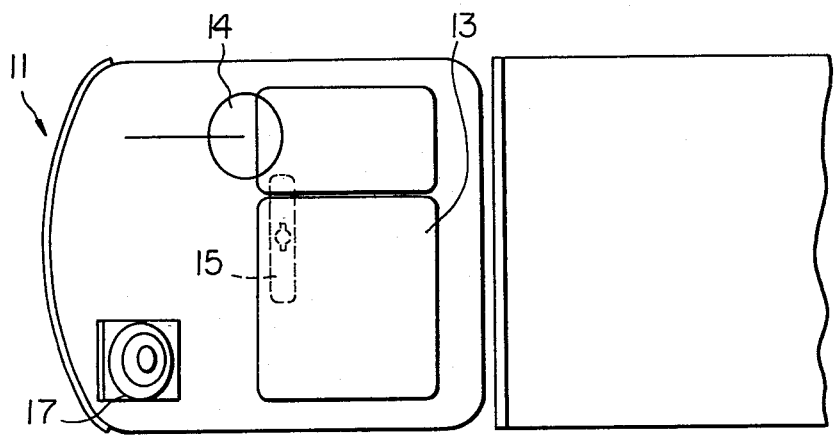
FIG. 1 is a diagrammatic plane view of a front portion of a compact cab-over truck equipped with a refrigeration device.
Figure 2:
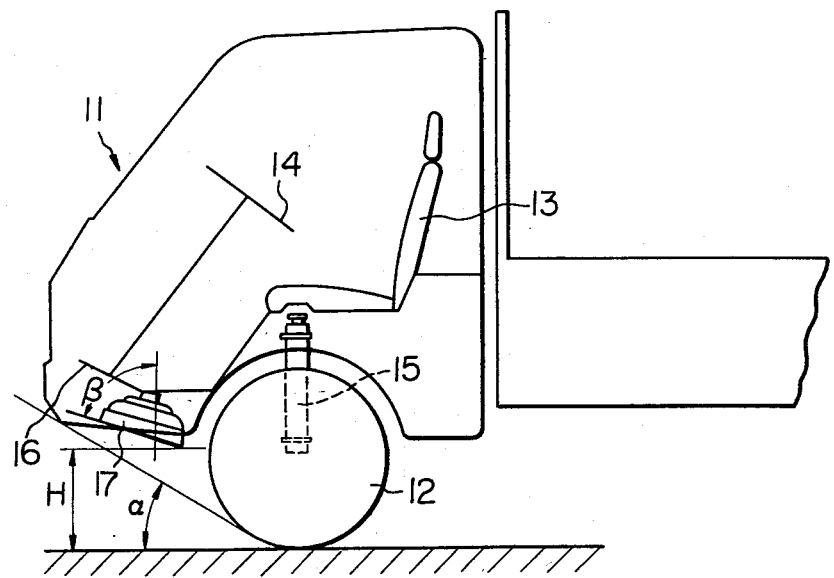
FIG. 2 is a diagrammatic side view of the front portion of the cab-over truck.

Referring to FIGS. 1 and 2, there is shown a compact cab-over truck 11, that is, an automotive vehicle with a cab at the front end over the engine. The vehicle 11 includes two front wheels, one of which is illustrated at 12, a seat 13 within the cab, a steering wheel 14, a radiator 15 for the engine disposed under the cab and a cab floor 16.

The vehicle 11 is equipped with a refrigeration device, only a condenser of which is illustrated at 17. The condenser 17 for the refrigeration device is disposed under the cab floor 16 and spaced forwards from the radiator 15 with respect to the longitudinal direction of the vehicle 11. If the steering wheel 14 is disposed on the righthand side of the vehicle 11 as viewed forwards, the condenser 17 is disposed on the lefthand side of the vehicle as shown in FIG. 1. If the steering wheel is disposed on the lefthand side, the condenser should be disposed on the righthand side of the vehicle.

Figure 3:
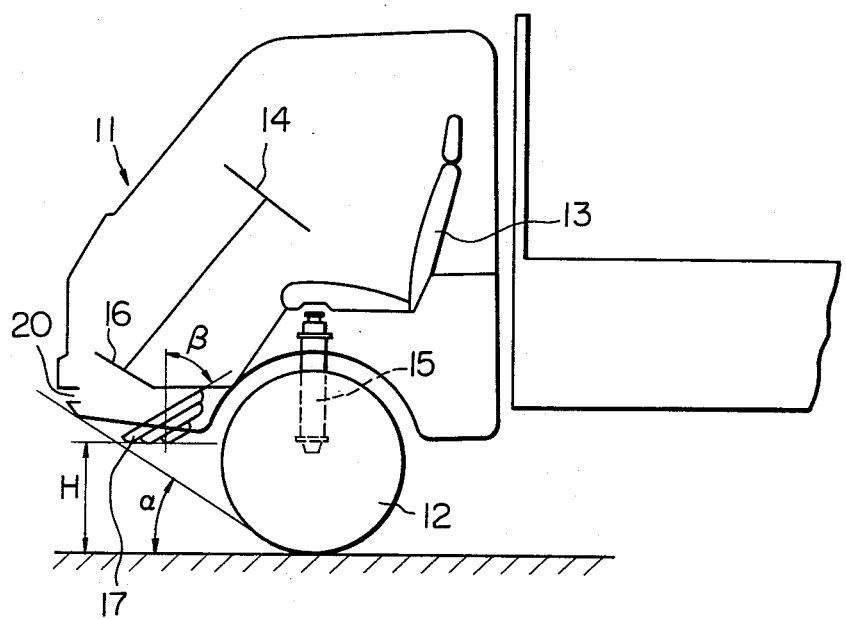
FIG. 3 is a diagrammatic view similar to the view shown in FIG. 2 showing second embodiment of the invention.

The condenser 17 has a core face thereof slanted forwards from the vertical of the vehicle 11 by an angle $\beta$, as shown in FIG. 2. If desired, the condenser 17 may have its core face slanted rearwards from the vertical by the angle $\beta$, as shown in FIG. 3. The angle $\beta$ is so determined that the installation of the condenser 17 will keep the minimum clearance H, that is, a distance between the lowest point of the vehicle 11 and the ground, and the banking angle $\alpha$. The angle $\beta$ ranges from 30° to 80°. In other words, $30° \leq \beta \leq 80°$ shall hold. The upper limit of the range has been determined as 80° taking slope ascending operating conditions into account because should the slanted angle of the core face of the condenser 17 be greater than 80°, the amount of cool air passing through the radiator 15 would be so little that the radiator could not work satisfactorily, while the lower limit of the range has been determined as 30° because of the structure of the vehicle 11.

To secure the amount of air passing through the slanted core face of the condenser 17, the condenser 17 is provided with an electric fan and a shroud.

It will now be recognized that because the condenser 17 is spaced forwards from the radiator, the effect of relatively hot air passed through the condenser 17 on the radiator 15 is minimized. It will also be recognized that because the core face of the condenser 17 is slanted from the vertical of the vehicle 11, sufficient amount of cool air passing through the radiator 15 for preventing of overheating of the engine is secured. Enough amount of air passing through the slanted core face of the condenser 17 is secured by the provision of the electric fan.

Although in the preceding description, the condenser 17 is disposed on the lefthand side of the vehicle (see FIG. 1) or on the righthand side of the vehicle in order to allow as much cool air to enter the radiator without passing through the condenser as possible, the condenser may be disposed at the front of the vehicle and in front of the radiator, or mounted on the vehicle and in front of the radiator and mounted under the cab floor by having a core face thereof slanted by the angle $\beta$. In this case, cool air passes over the condenser to enter the radiator to cool the same.

In the case of the embodiment shown in FIG. 3, it is preferable to form an opening 20 through the front panel or apron of the vehicle 11 to increase the amount of cool air passing through the condenser 17.

The arrangement of the condenser 17 described in the preceding has the following results.

(1) The possibility of overheating of the engine is greately reduced because the condenser is mounted so as not to block flow of cool air to enter the radiator.

(2) Space at the front and under the cab floor which had not been utilized in the compact cab-over is now effectively used by this arrangement.

(3) Because the condenser is disposed under the cab floor, the repair and service of the condenser is quite easy.

What is claimed is:

1. In an automotive vehicle with a cab at the front, a radiator for an engine for propelling the vehicle mounted within an engine compartment disposed under and separated from said cab by a cab floor;

a condenser for a refrigeration device mounted within the engine compartment at an area disposed forward from said radiator with respect to the longitudinal direction of the vehicle and slanted from a perpendicular plane transverse to the longitudinal direction of the vehicle by a predetermined angle, said condenser having an electric fan and a shroud means for securing a sufficient amount of air passing therethrough;

said condenser being disposed laterally of the radiator and on an opposite side of the engine compartment to a side over which a steering wheel of the vehicle is disposed;

said condenser being arranged and slanted so that when in operation of the vehicle a sufficient amount of ambient atmosphere required by said radiator will flow toward said radiator without passing through said condenser.

2. The combination as claimed in claim 1, in which the predetermined angle is within the range from 30° to 80°.

* * * * *